United States Patent
Takahashi

(10) Patent No.: US 11,548,209 B2
(45) Date of Patent: Jan. 10, 2023

(54) METHOD AND APPARATUS FOR FORMING UNCURED RUBBER COMPONENT

(71) Applicant: Sumitomo Rubber Industries, Ltd., Hyogo (JP)

(72) Inventor: Hirokazu Takahashi, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 574 days.

(21) Appl. No.: 16/591,431

(22) Filed: Oct. 2, 2019

(65) Prior Publication Data
US 2020/0130253 A1    Apr. 30, 2020

(30) Foreign Application Priority Data
Oct. 25, 2018   (JP) .............................. JP2018-200470

(51) Int. Cl.
*B29C 61/02* (2006.01)
*B29C 48/00* (2019.01)
*B29K 105/24* (2006.01)

(52) U.S. Cl.
CPC .......... *B29C 61/02* (2013.01); *B29C 48/0022* (2019.02); *B29K 2105/246* (2013.01)

(58) Field of Classification Search
CPC ............... B29C 61/02; B29C 48/0022; B29K 2105/246

USPC ......................................................... 264/151
See application file for complete search history.

(56) References Cited

U.S. PATENT DOCUMENTS

2005/0284553 A1* 12/2005 Ikeda .................... B29D 30/60
152/209.5

FOREIGN PATENT DOCUMENTS

JP           2009-184152 A     8/2009

* cited by examiner

*Primary Examiner* — Jeffrey M Wollschlager
*Assistant Examiner* — Xue H Liu
(74) *Attorney, Agent, or Firm* — Studebaker & Brackett PC

(57) ABSTRACT

A method for forming an uncured rubber component, the method includes conveying an uncured extruded rubber strip extruded continuously from an extruder using a conveyor, the conveyor including a first conveyor and a second conveyor located at a downstream side of the first conveyor in a convey direction, the step of conveying including shrinking the uncured extruded rubber strip, wherein the step of shrinking is such that the uncured extruded rubber strip, in a relaxed state of a U-shaped manner, passes through fluid held in a tank between the first conveyor and the second conveyor without being restrained so that the uncured extruded rubber strip shrinks freely while receiving buoyancy from the fluid, and cutting the uncured extruded rubber strip in a predetermined length to form an uncured rubber component, after the step of shrinking.

4 Claims, 1 Drawing Sheet

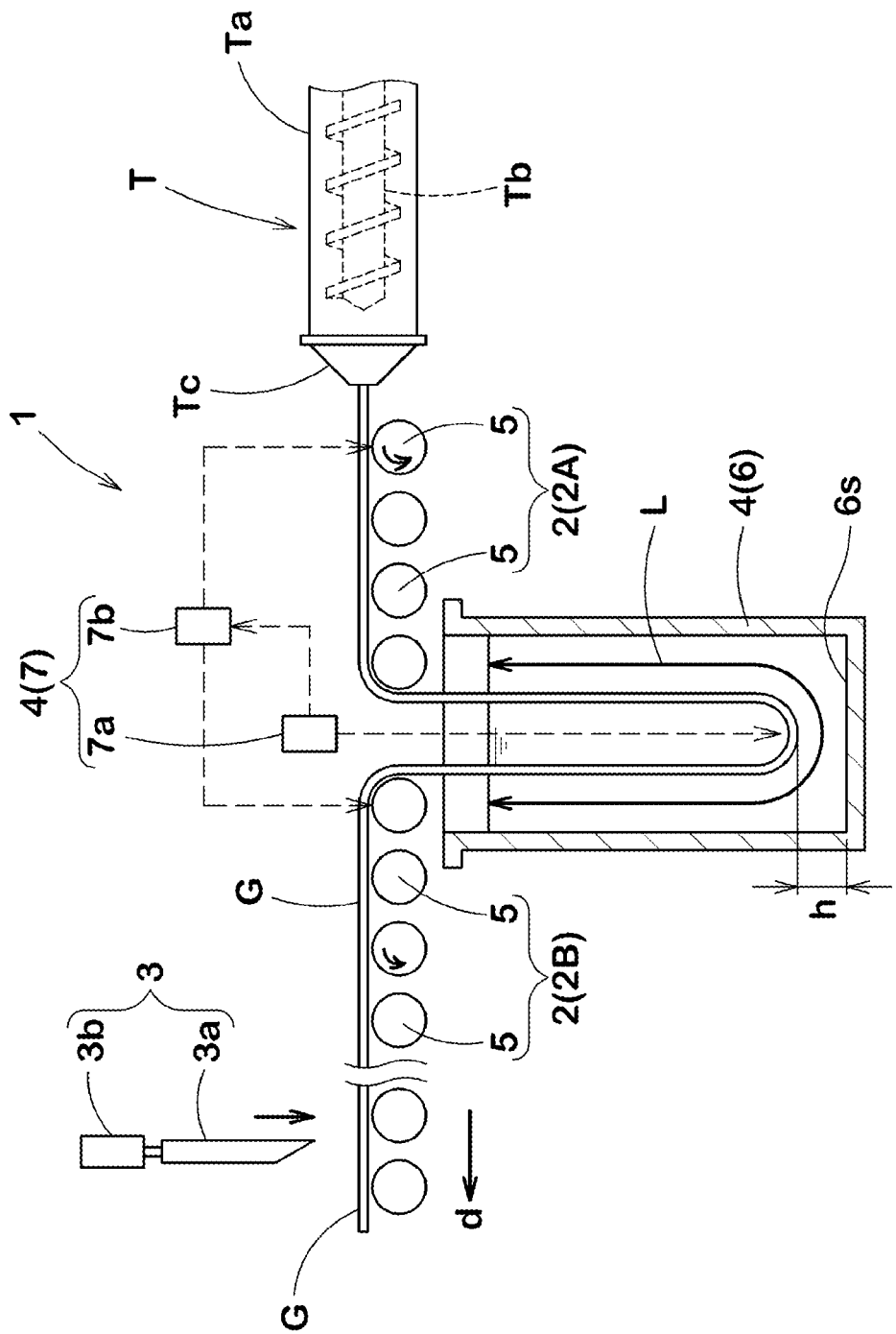

METHOD AND APPARATUS FOR FORMING UNCURED RUBBER COMPONENT

BACKGROUND ART

Field of the Disclosure

The present disclosure relates to method and apparatus for forming an uncured rubber component.

Description of the Related Art

Uncured rubber components are formed by cutting uncured extruded rubber strips extruded from rubber extruders in a predetermined length. It has been known that uncured rubber components shrink after being cut due to internal stress received during extruding process. The following Patent document 1 has proposed a method for forming a rubber component which includes a shrinking process such that an uncured extruded rubber strip is dangled in the air to proceed shrinking.

PATENT DOCUMENT

[Patent document 1] Japanese Unexamined Patent Application Publication 2009-184152

SUMMARY OF THE DISCLOSURE

Unfortunately, the uncured extruded rubber strip which is being dangled in the air is stretched by receiving its own weight. Thus, after the shrinking process, internal stress still remains in the uncured extruded rubber strip due to the stretch added, and therefore it is difficult to form a rubber component having sufficient stability in shape.

In view of the above problems, the present disclosure has an object to provide method and apparatus for forming an uncured rubber component having stability in shape by employing an improved shrinking process.

In one aspect of the first disclosure, a method for forming an uncured rubber component, the method includes conveying an uncured extruded rubber strip extruded continuously from an extruder using a conveyor, the conveyor including a first conveyor and a second conveyor located at a downstream side of the first conveyor in a convey direction, the step of conveying including shrinking the uncured extruded rubber strip, wherein the step of shrinking is such that the uncured extruded rubber strip, in a relaxed state of a U-shaped manner, passes through fluid held in a tank between the first conveyor and the second conveyor without being restrained so that the uncured extruded rubber strip shrinks freely while receiving buoyancy from the fluid, and cutting the uncured extruded rubber strip in a predetermined length to form an uncured rubber component, after the step of shrinking.

In another aspect of the first disclosure, in the step of shrinking, the uncured extruded rubber strip may pass through the fluid so as not to contact with a bottom surface of the tank.

In another aspect of the first disclosure, in the step of shrinking, a length of the uncured extruded rubber strip passing through the fluid may be from 1.6 to 2.0 times the predetermined length of the uncured rubber component.

In another aspect of the first disclosure, the step of shrinking may include adjusting a height (h) from a bottom surface of the tank to a lowermost position of the uncured extruded rubber strip in the tank.

In another aspect of the first disclosure, the step of adjusting may include supporting the uncured extruded rubber strip by the first conveyor and the second conveyor, conveying the uncured extruded rubber strip such that conveying speed of the second conveyor is set slower than that of the first conveyor so that the uncured extruded rubber strip located between the first conveyor and the second conveyor starts getting into the fluid, and adjusting conveying speed of the first conveyor being the same as that of the second conveyor when the height (h) reaches a predetermined value.

In one aspect of the second disclosure, an apparatus for forming an uncured rubber component, the apparatus includes a conveyor for conveying an uncured extruded rubber strip extruded continuously from an extruder, the conveyor including a first conveyor and a second conveyor located at a downstream side of the first conveyor in a convey direction, a cutter for cutting the uncured extruded rubber strip in a predetermined length to form an uncured rubber component, and a shrinker for shrinking the uncured extruded rubber strip during the step of conveying. The shrinker includes a tank disposed between the first conveyor and the second conveyor. The tank is configured to hold fluid in such a way that the uncured extruded rubber strip, in a relaxed state of a U-shaped manner, passes through the fluid held in a tank without being restrained so that the uncured extruded rubber strip shrinks freely while receiving buoyancy from the fluid.

In another aspect of the second disclosure, the shrinker may further include an adjusting device for adjusting a height (h) of a lowermost position of the uncured extruded rubber strip in the fluid from a bottom surface of the tank.

In another aspect of the second disclosure, the adjusting device may include a measurement device for measuring and outputting a signal corresponding to the height (h), and a speed controller for controlling speed of the conveyor based on the signal received from the measurement device.

In another aspect of the second disclosure, the measurement device may include a supersonic wave sensor.

BRIEF DESCRIPTION OF THE DRAWINGS

The FIGURE is a schematically side view of an apparatus for forming an uncured rubber component in accordance with an embodiment of the present disclosure.

DESCRIPTION OF THE PREFERRED EMBODIMENTS

An embodiment of the present disclosure will be explained below with reference to the accompanying drawings. The FIGURE is a schematically side view of an apparatus for forming an uncured rubber component 1 (hereinafter, it may simply be referred to "the apparatus 1") in accordance with an embodiment of the present disclosure. The apparatus 1 according to the present disclosure can convey an uncured extruded rubber strip G extruded from a rubber extruder T to a downstream side (d) in a convey direction and can cut the same to form an uncured rubber component (not illustrated). The uncured rubber component, for example, may be used as various kinds of uncured tyre rubber components. In the FIGURE, the downstream side (d) in the convey direction of the uncured extruded rubber strip G is denoted by an arrow.

As illustrated in the FIGURE, the apparatus 1 according to the present embodiment includes a conveyor 2, a cutter 3, and a shrinker 4.

The conveyor 2 according to the present embodiment conveys the uncured extruded rubber strip G extruded continuously from the rubber extruder T to the downstream (d) in the convey direction. The conveyor 2, in the present embodiment, includes a first conveyor 2A located at an upstream side in the convey direction and a second conveyor 2B located at a downstream side (d) of the first conveyor 2A in the convey direction.

The rubber extruder T, for example, has a conventional structure which includes a cylinder Ta having a rubber feeding port (not illustrated), and a screw shaft Tb disposed in the cylinder Ta. The rubber extruder T according to the present embodiment can carry a raw rubber material for the uncured extruded rubber strip (not illustrated) forward while kneading by rotating screw shaft Tb, and then can extrude it continuously through an extruding opening of an extruding head Tc provided on a front end of the cylinder Ta.

The first conveyor 2A and the second conveyor 2B according to the present embodiment, for example, are configured as roller conveyors having a plurality of conveying rollers 5. The conveyor rollers 5, for example, have outer surfaces which receive and convey the uncured extruded rubber strip G A rotation speed of conveying rollers determines a conveying speed of the uncured extruded rubber strip G.

The conveying rollers 5, for example, are configured to be rotated by an electric motor (not illustrated). It is preferable that the conveying rollers 5, for example, are adjusted in rotation speed by a controlling device such as inverter circuit. As the first conveyor 2A and the second conveyor 2B, a belt conveyor and a ball conveyor, for example, may be used instead of the roller conveyor.

The cutter 3 can cut the uncured extruded rubber strip G in a predetermined length to form one or more uncured rubber components. The cutter 3 according to the present embodiment is located at the downstream side (d) in the convey direction with respect to the second conveyor 2B. The cutter 3 according to the present embodiment includes a cutter blade 3a and a moving device 3b for moving the cutter blade 3a to a predetermined place to cut the uncured extruded rubber strip G As the cutter blade 3a, conventional cutters, e.g., a rotational disk-shaped cutter and a guillotine blade, can be preferably employed, for example. The moving device 3b, for example, can preferably be configured as a conventional structure which includes an actuator such as cylinder, motor and the like.

The shrinker 4 is located between the first conveyor 2A and the second conveyor 2B. The shrinker 4 according to the present embodiment includes a tank 6 for holding fluid therein. As the fluid held in the tank 6, water or alcohol, for example, may preferably be employed in order to provide the uncured extruded rubber strip G with buoyancy. Temperature of the fluid, for example, is preferably in a range of from 0 to 25 degrees C. in order to suppress reduction in adhesive property of the uncured extruded rubber strip G The tank 6 may be configured as a conventional structure which has an upper opening on the upper side, for example. Preferably, the tank 6 may be provided with a conventional temperature controlling device (not illustrated) which can control and maintain temperature of the fluid.

In some preferred embodiments, the shrinker may further include an adjusting device 7 capable of adjusting a height h of the uncured extruded rubber strip G in the fluid from the bottom surface 6s of the tank 6. The adjusting device 7, in the present embodiment, includes a measurement device 7a which measures a height h from a bottom surface 6s of the tank 6 to the lowermost position of the uncured extruded rubber strip G, and speed controller 7b which controls the conveying speed of the uncured extruded rubber strip G based on the height h measured by measurement device 7a.

As the measurement device 7a, an ultrasonic wave sensor, for example, may preferably be employed. The measurement device 7a, in the present embodiment, can output a signal corresponding to the measurement value to the speed controller 7b.

Based on an inputted signal from the measurement device 7a, the speed controller 7b in accordance with the present embodiment can control the number of rotations of conveyor rollers 5 of the first conveyor 2A and the second conveyor 2B, i.e., speed of the uncured extruded rubber strip being conveyed by the respective first conveyor 2A and second conveyor 2B. A height h of the lowermost position of the uncured extruded rubber strip G in the fluid, for example, can be adjusted by the speed difference between the first conveyor 2A and the second conveyor 2B. As the speed controller 7b, for example, various conventional devices, e.g., programmable sequencers, micro-computers, personal computers, and the like can suitably be employed.

Next, a method for forming an uncured rubber component using the apparatus 1 according to the present embodiment will be described. First, a step of extruding in which an uncured extruded rubber strip G is extruded continuously from the rubber extruder T is conducted. In the step of extruding, the rotation speed of the screw shaft Tb is controlled at a predetermined constant value using an electric motor (not illustrated), for example. Internal stress remains in the uncured extruded rubber strip G.

Next, a step of conveying the uncured extruded rubber strip G is conducted. The step of conveying includes a first step for conveying the uncured extruded rubber strip G using the first conveyor 2A and a second step for conveying the uncured extruded rubber strip G using the second conveyor 2B.

In the present embodiment, a step of shrinking in which the uncured extruded rubber strip G is shrunk is conducted between the first step and the second step.

In the step of shrinking according to the present embodiment, the uncured extruded rubber strip G passes through the fluid held in the tank 6 between the first conveyor 2A and the second conveyor 2b. It is preferable that the fluid is kept at a predetermined temperature by a conventional temperature adjusting device.

There is no conveyor in the tank 6, and thus the uncured extruded rubber strip G is supported by buoyancy from the fluid so as not to contact with the bottom surface 6s of the tank 6. Therefore, the uncured extruded rubber strip G passes through the fluid without being restrained in a relaxed state of a U-shaped manner, suppressing elongation thereof due to its own weight, shrinking freely while receiving the buoyancy.

In order to eliminate an extension of the uncured extruded rubber strip G due to its own weight effectively, the step of shrinking preferably includes adjusting a height h from the bottom surface 6s of the tank 6 to the lowermost position of the uncured extruded rubber strip G in the tank.

The step of adjusting, for example, adjusts the height h such that a length L of the uncured extruded rubber strip G dipped into the fluid is in a range of from 1.6~2.0 times a predetermined length L' (not illustrated) of the uncured rubber component to be obtained by cutting. When the length L of the uncured extruded rubber strip G in the fluid is less than 1.6 times the length L' of the uncured rubber component, shrinking in the fluid of the uncured extruded rubber strip G may not complete, resulting in shrinkage of the uncured rubber component. When the length L of the uncured extruded rubber strip G in the fluid is more than 2.0 times the length L' of the uncured rubber component, adhesive property of the uncured extruded rubber strip G may be lowered and the conveying process may need a long time, for example. Note that when the height h from the bottom surface 6s of the tank 6 to the lowermost position of the uncured extruded rubber strip G reaches a predetermined value, the conveying speeds of first conveyor 2A and second conveyor 2B are adjusted to the same as with one another.

In order to exert the above effect efficiently, time for the uncured extruded rubber strip G passing through the fluid, for example, is preferably in a range of from 0.5 to 10 minutes.

There are various ways for the uncured extruded rubber strip G how to pass through the fluid. For example, after the uncured extruded rubber strip G is supported by both first conveyor 2A and second conveyor 2B, conveying speed of the second conveyor 2B is set slower than that of the first conveyor 2A so that the uncured extruded rubber strip G located between the first conveyor 2A and the second conveyor 2B gets into the fluid. Alternately, a clamping device (not illustrated) may clamp one end of the uncured extruded rubber strip G and guides it into the fluid in a U-shaped manner, and then the clamp device can put the one end on the second conveyor 2B.

Next, a step of cutting is conducted. The step of cutting according to the present embodiment cuts the uncured extruded rubber strip G in the predetermined length L' to form the uncured rubber component. In the step of shrinking, the uncured rubber component had less or no elongation due to its own weight, shrinkage of the uncured rubber component can be suppressed, being stability in shape.

While the particularly preferable embodiments in accordance with the present disclosure have been described in detail, the present disclosure is not limited to the illustrated embodiments, but can be modified and carried out in various aspects.

What is claimed is:

1. A method for forming an uncured rubber component, the method comprising:
    conveying an uncured extruded rubber strip extruded continuously from an extruder using a conveyor, the conveyor comprising a first conveyor and a second conveyor located at a downstream side of the first conveyor in a convey direction,
    the step of conveying comprising shrinking the uncured extruded rubber strip,
    wherein the step of shrinking is such that the uncured extruded rubber strip, in a relaxed state of a U-shaped manner, passes through fluid held in a tank between the first conveyor and the second conveyor without being restrained so that the uncured extruded rubber strip shrinks freely while receiving buoyancy from the fluid; and
    cutting the uncured extruded rubber strip in a predetermined length to form an uncured rubber component, after the step of shrinking,
    wherein the step of shrinking comprises adjusting a height (h) from a bottom surface of the tank to a lowermost position of the uncured extruded rubber strip in the tank,
    wherein the step of adjusting comprises:
    supporting the uncured extruded rubber strip by the first conveyor and the second conveyor,
    conveying the uncured extruded rubber strip such that conveying speed of the second conveyor is set slower than that of the first conveyor so that the uncured extruded rubber strip located between the first conveyor and the second conveyor gets into the fluid, and
    adjusting conveying speed of the first conveyor being the same as that of the second conveyor when the height (h) reaches a predetermined value.

2. The method for forming an uncured rubber component according to claim 1, wherein in the step of shrinking, a length of the uncured extruded rubber strip passing through the fluid is from 1.6 to 2.0 times the predetermined length of the uncured rubber component.

3. A method for forming an uncured rubber component, the method comprising:
    conveying an uncured extruded rubber strip extruded continuously from an extruder using a conveyor, the conveyor comprising a first conveyor and a second conveyor located at a downstream side of the first conveyor in a convey direction,
    the step of conveying comprising shrinking the uncured extruded rubber strip,
    wherein the step of shrinking is such that the uncured extruded rubber strip, in a relaxed state of a U-shaped manner, passes through fluid held in a tank between the first conveyor and the second conveyor without being restrained so that the uncured extruded rubber strip shrinks freely while receiving buoyancy from the fluid; and
    cutting the uncured extruded rubber strip in a predetermined length to form an uncured rubber component, after the step of shrinking, wherein
    the step of shrinking comprises:
    measuring a height (h) from a bottom surface of the tank to a lowermost position of the uncured extruded rubber strip in the tank by a measurement device, and adjusting the height (h).

4. A method for forming an uncured rubber component, the method comprising:
    conveying an uncured extruded rubber strip extruded continuously from an extruder using a conveyor, the conveyor comprising a first conveyor and a second conveyor located at a downstream side of the first conveyor in a convey direction,
    the step of conveying comprising shrinking the uncured extruded rubber strip,
    wherein the step of shrinking is such that the uncured extruded rubber strip, in a relaxed state of a U-shaped manner, passes through fluid held in a tank between the first conveyor and the second conveyor without being restrained so that the uncured extruded rubber strip shrinks freely while receiving buoyancy from the fluid; and
    cutting the uncured extruded rubber strip in a predetermined length to form an uncured rubber component, after the step of shrinking,
    wherein the step of shrinking comprises:
    measuring a height (h) from a bottom surface of the tank to a lowermost position of the uncured extruded rubber strip in the tank by a measurement device, and adjusting the height (h)
    wherein the step of adjusting comprises:
    supporting the uncured extruded rubber strip by the first conveyor and the second conveyor, and
    adjusting conveying speed of the second conveyor with respect to the first conveyor according to the height (h) measured by the measurement device.

* * * * *